(12) United States Patent
Siomina et al.

(10) Patent No.: US 8,849,302 B2
(45) Date of Patent: Sep. 30, 2014

(54) UE-SIDE REMOVAL OF POSITIONING ASSISTANCE AMBIGUITY

(75) Inventors: Iana Siomina, Solna (SE); Yang Zhang, Shanghai (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 376 days.

(21) Appl. No.: 13/390,626

(22) PCT Filed: Jan. 19, 2012

(86) PCT No.: PCT/SE2012/050043
§ 371 (c)(1),
(2), (4) Date: Feb. 15, 2012

(87) PCT Pub. No.: WO2012/108814
PCT Pub. Date: Aug. 16, 2012

(65) Prior Publication Data
US 2012/0208552 A1    Aug. 16, 2012

(30) Foreign Application Priority Data
Feb. 11, 2011   (WO) ................ PCT/CN2011/000211

(51) Int. Cl.
*H04W 24/00*  (2009.01)
*G01S 3/02*   (2006.01)
*H04W 64/00*  (2009.01)
*H04W 4/02*   (2009.01)

(52) U.S. Cl.
CPC .............. *H04W 64/003* (2013.01); *H04W 4/02* (2013.01)
USPC ...................... 455/456.1; 455/456.6; 342/450; 342/458

(58) Field of Classification Search
CPC ...... H04W 4/02; H04W 64/00; H04W 64/003
USPC .......... 455/456.1, 456.2, 456.3, 456.5, 456.6; 342/450, 451, 458
See application file for complete search history.

(56) References Cited

U.S. PATENT DOCUMENTS

| 2005/0090266 | A1* | 4/2005 | Sheynblat | .................. | 455/456.1 |
| 2011/0081917 | A1* | 4/2011 | Frank et al. | ................ | 455/456.1 |
| 2011/0105144 | A1* | 5/2011 | Siomina et al. | ............ | 455/456.1 |
| 2012/0040687 | A1* | 2/2012 | Siomina et al. | ............ | 455/456.1 |
| 2012/0275329 | A1* | 11/2012 | Chin et al. | .................... | 370/252 |

FOREIGN PATENT DOCUMENTS

| EP | 1289331 A2 | 3/2003 |
| WO | 2007023446 A1 | 3/2007 |
| WO | 2011056119 A1 | 5/2011 |

(Continued)

*Primary Examiner* — Wesley Kim
(74) *Attorney, Agent, or Firm* — Coats & Bennett, PLLC

(57) ABSTRACT

A user equipment (36) herein resolves timing ambiguities associated with when the user equipment (360 is to perform assisted positioning measurements. The user equipment (36) receives assistance data that indicates positioning occasion periodicities of a first cell and a reference cell, and that indicates a positioning occasion timing offset between those cells. The user equipment (36) performs signal detection at candidate timing offsets surrounding the indicated positioning occasion timing offset, to determine which candidate timing offset has the greatest probability of being the actual positioning occasion timing offset between the first cell and the reference cell. The user equipment (36) may then time assisted positioning measurements for the first cell based on the candidate timing offset determined as most likely being the actual timing offset, rather than necessarily timing those measurements based on the offset indicated in the assistance data.

34 Claims, 11 Drawing Sheets

(56) References Cited

FOREIGN PATENT DOCUMENTS

| WO | 2011142710 | A1 | 11/2011 |
| WO | 2012021097 | A2 | 2/2012 |
| WO | 2012023893 | A1 | 2/2012 |
| WO | 2012044246 | A1 | 4/2012 |

* cited by examiner

```
ProvideAssistanceData-r9-IEs ::= SEQUENCE {
    commonIEsProvideAssistanceData   CommonIEsProvideAssistanceData   OPTIONAL,  -- Need ON
    a-gnss-ProvideAssistanceData     A-GNSS-ProvideAssistanceData     OPTIONAL,  -- Need ON
    otdoa-ProvideAssistanceData      OTDOA-ProvideAssistanceData      OPTIONAL,  -- Need ON
    epdu-Provide-Assistance-Data     EPDU-Sequence                    OPTIONAL,  -- Need ON
    ...
}
```

*FIG. 3*
*(PRIOR ART)*

```
-- ASN1START

OTDOA-ProvideAssistanceData ::= SEQUENCE {
    otdoa-ReferenceCellInfo      OTDOA-ReferenceCellInfo       OPTIONAL,
    otdoa-NeighbourCellInfo      OTDOA-NeighbourCellInfoList   OPTIONAL,
    otdoa-Error                  OTDOA-Error                   OPTIONAL,
    ...
}

-- ASN1STOP
```

*FIG. 4*
*(PRIOR ART)*

UE-SIDE REMOVAL OF POSITIONING ASSISTANCE AMBIGUITY

RELATED APPLICATION

This application claims priority from International Patent App. No. PCT/CN2011/000211, which was filed on 11 Feb. 2011 and was entitled "Non-Ambiguous Positioning Measurements with Cell-Specific Signal Periodicity."

TECHNICAL FIELD

The present invention generally relates to a user equipment that receives assistance for performing measurements on cells, and particularly relates to processing at the user equipment to resolve ambiguities or other problems with the assistance that arise because of differences in positioning occasion periodicities of different cells.

BACKGROUND

The availability of several techniques and devices for identifying the geographical location of mobile device users has enabled a large variety of commercial and non-commercial services, such as navigation assistance, enhanced social networking, location-aware advertising, and location-aware emergency calls. However, different services may have different positioning accuracy requirements imposed by the application. In addition, some regulatory requirements on the positioning accuracy for basic emergency services exist in some countries, such as the FCC's E-911-related requirements in the United States.

In many environments, the position of a mobile device user can be accurately estimated by using positioning methods based on GPS (Global Positioning System) or other satellite-based system. Nowadays, wireless networks are often able to provide positioning-related assistance to mobile terminals (often referred to as user equipment, or UEs, or wireless terminals, mobile stations, or simply "mobiles") to improve the terminal's receiver sensitivity and GPS start-up performance. Several of these techniques are known as Assisted-GPS positioning, or A-GPS.

GPS or A-GPS receivers may not be available in all UE, however. Furthermore, GPS is known to fail in certain indoor environments and in urban "canyons" in the radio shadows caused by tall buildings. Complementary terrestrial positioning methods, such as one approach called Observed Time-Difference-of-Arrival (OTDOA), have therefore been standardized by the 3rd-Generation Partnership Project (3GPP) and are deployed in various wireless networks. In addition to OTDOA, the 3GPP standards for the so-called Long-Term Evolution (LTE) wireless system also specify methods, procedures and signalling support for techniques called Enhanced Cell ID (E-CID) and Assisted Global Navigation Satellite System (A-GNSS). Later, a network-based technique called Uplink Time-Difference-of-Arrival (UTDOA) may also be standardized for LTE.

Three key network elements for providing location services (LCS) in an LTE positioning architecture include the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client.

Position calculation can be conducted, for example, by a UE or by a positioning server, such as an Enhanced Serving Mobile Location Center, E-SMLC, or Secure User Plan Location (SUPL) Location Platform (SLP) in LTE. The former approach corresponds to the UE-based positioning mode, whilst the latter corresponds to the UE-assisted positioning mode.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between evolved Node B (eNodeB) and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently Open Mobiel Alliance (OMA) LPP extensions are being specified (LPPe) to allow e.g. for operator-specific assistance data or assistance data that cannot be provided with LPP or to support other position reporting formats or new positioning methods.

A high-level architecture of such an LTE system 10 is illustrated in FIG. 1. In FIG. 1, the system 10 includes a UE 12, a radio access network (RAN) 14, and a core network 16. The UE 12 comprises the LCS target. The core network 16 includes an E-SMLC 18 and/or an SLP 20, either of which may comprise the LCS Server. The control plane positioning protocols with the E-SMLC 14 as the terminating point include LPP, LPPa, and LCS-AP. The user plane positioning protocols with the SLP 16 as the terminating point include SUPL/LPP and SUPL. Although note shown, the SLP 20 may comprise two components, a SUPL Positioning Center (SPC) and a SUPL Location Center (SLC), which may also reside in different nodes. In an example implementation, the SPC has a proprietary interface with E-SMLC, and an Llp interface with the SLC. The SLC part of the SLP communicates with a P-GW (PDN-Gateway) 22 and an External LCS Client 24.

Additional positioning architecture elements may also be deployed to further enhance performance of specific positioning methods. For example, deploying radio beacons 26 is a cost-efficient solution which may significantly improve positioning performance indoors and also outdoors by allowing more accurate positioning, for example, with proximity location techniques.

To meet varying demands for different Location-Based Services (LBS), an LTE network will deploy a range of complementing methods characterized by different performance in different environments. Depending on where the measurements are conducted and where the final position is calculated, the methods can be UE-based, UE-assisted, or network-based, each with own advantages. The following methods are available in the LTE standard for both the control plane and the user plane: (1) Cell ID (CID), (2) UE-assisted and network-based E-CID, including network-based angle of arrival (AoA), (3) UE-based and UE-assisted A-GNSS (including A-GPS), and (4) UE-assisted OTDOA.

Several other techniques such as hybrid positioning, fingerprinting positioning and adaptive E-CID (AECID) do not require additional standardization and are therefore also possible with LTE. Furthermore, there may also be UE-based versions of the methods above, e.g. UE-based GNSS (e.g. GPS) or UE-based OTDOA, etc. There may also be some alternative positioning methods such as proximity based location. UTDOA may also be standardized in a later LTE release, since it is currently under discussion in 3GPP. Similar methods, which may have different names, also exist for radio-access technologies ((RATS) other than LTE, such as CDMA, WCDMA or GSM.

With particular regard to the OTDOA positioning method, this method makes use of the measured timing of downlink signals received from multiple base stations (evolved NodeBs, or eNodeBs, in LTE) at the UE. The UE measures the timing of the received signals using assistance data received from the LCS server, and the resulting measurements are used to locate the UE in relation to the neighbouring eNodeBs.

More specifically, the UE measures the timing differences for downlink reference signals received from multiple distinct locations or neighboring cells. For each (measured) neighbor cell, the UE measures Reference Signal Time Difference (RSTD), which is a relative timing difference between the neighbor cell and a defined reference cell. The UE position estimate is then found as the intersection of hyperbolas corresponding to the measured RSTDs. At least three measurements from geographically dispersed base stations with a good geometry are needed to solve for two coordinates of the UE and the receiver clock bias. In order to solve for position, precise knowledge of the transmitter locations and transmit timing offset is needed.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP. Details are specified in 3GPP TS 36.211; as of February 2011, version 10.0.0 of this specification is available from http://www.3gpp.org.

PRS are transmitted from one antenna port of a base station according to a pre-defined pattern. A frequency shift, which is a function of Physical Cell Identity (PCI), can be applied to the specified PRS patterns to generate orthogonal patterns. The mapping of frequency shifts to PCT models an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS) could be used for positioning measurements, in principle.]

PRS are transmitted in pre-defined positioning sub-frames grouped by several consecutive sub-frames ($N_{PRS}$), i.e., one positioning occasion. FIG. 2, for instance, shows an example where one positioning occasion includes PRS transmitted in $N_{PRS}=6$ consecutive sub-frames, Positioning occasions occur periodically with a defined periodicity $T_{PRS}$ of N sub-frames, i.e., the time interval between two positioning occasions. The standardized periods $T_{PRS}$ are 160, 320, 640, and 1280 ms, and the standardized number of consecutive sub-frames $N_{PRS}$ may be 1, 2, 4, or 6

Information about such PRS and other information that will assist with positioning measurements is included in so-called assistance data. Different sets of assistance data are typically used for different methods. Regardless, the positioning assistance data is sent by the positioning server, or via some other node, to UEs or other radio nodes in order to assist with positioning measurements. For example, assistance data may be sent via LPP to an eNodeB for transmission to the UE. In this case, the transmission of assistance data may be transparent to the eNodeB and the Mobility Management Entity (MME). The assistance data may also be sent by the eNodeB via LPPa to a positioning server for further transfer to the UE. In some cases, the assistance data may be sent on request from a wireless device that needs to perform measurements. In other cases, the assistance data is sent in an unsolicited way.

In LTE, the assistance data may be requested and provided over LPP protocol by including requestAssistanceData and provideAssistanceData elements in the LPP message, respectively. The current LTE standard specifies the following structure for provideAssistanceData, which is illustrated in FIG. 3, where the commonIEsProvideAssistanceData information element (IE) is provided for future extensibility only and is not used so far. The LTE assistance data may thus be provided for A-GNSS and OTDOA. The EPDU-Sequence contains IEs that are defined externally to LPP by other organizations, which currently may only be used for OMA LPP extensions (LPPe).

Since for OTDOA positioning PRS signals from multiple distinct locations need to be measured, the UE receiver may have to deal with PRS that are much weaker than those received from the serving cell. Furthermore, without an approximate knowledge of when the measured signals are expected to arrive in time and what is the exact PRS pattern, the UE must perform signal search within a large window. This can impact the time and accuracy of the measurements as well as the UE complexity. To facilitate UE measurements, the network transmits assistance data to the UE, which includes, among other things, reference cell information, a neighbour cell list containing Physical Cell Identifiers (PCIs) of neighbour cells, the number of consecutive downlink subframes within a positioning occasion, PRS transmission bandwidth, frequency, etc.

In LPP, the OTDOA assistance data is provided within the Information Element (IE) OTDOA-ProvideAssistanceData, as shown in FIG. 4. Similar structures for OTDOA exist in LPPe.

The OTDOA assistance data includes information about the reference cell and neighbour cells for which OTDOA is to be determined. The neighbour cells may or may not be on the same frequency as the reference cell, and the reference cell may or may not be on the same frequency as the serving cell, and may or may not be the serving cell. Measurements that involve cells on a frequency different than the serving cell are inter-frequency measurements. Measurements on the same frequency as the serving cell are intra-frequency measurements. Different requirements apply for intra- and inter-frequency measurements.

For each cell in the assistance data, PRS information may be provided. The following information comprises the PRS information, according to 3GPP TS 36.355: PRS, bandwidth, PRS configuration index, the number $N_{PRS}$ of consecutive DL subframes (1, 2, 4, or 6) where PRS are transmitted, and muting information. PRS configuration index for a cell, as specified in 3GPP TS 36.211, defines the offset of that cell's first PRS subframe from a reference time point (SFN=0, where SFN refers to System Frame Number), as well as the periodicity $T_{PRS}$ of that cell's positioning occasions.

PRS information, in particular PRS periodicity, may be cell-specific. The cell-specific nature of the PRS information may be attributable to different cells belonging to different systems, different cells having different PRS bandwidths (e.g., a smaller bandwidth may require more frequent PRS occasions), different cells having different traffic loads (e.g., to reduce PRS overhead and capacity loss when no data transmissions are allowed in PRS positioning occasions, less frequent PRS positioning occasions may be configured), or the like.

Furthermore, positioning occasions may be misaligned on purpose, e.g., due to network deployment issues. Such purposeful misalignment might exist, for instance, in a network with a mix of macro cells and low-power nodes (e.g., pica or femto nodes), since interference issues may be caused by that network deployment. In a synchronous, or at least subframe-aligned network, an alternative could be to configure more frequent PRS positioning occasions that are aligned for cells, but to configure muting to avoid PRS collisions with interfering neighbour cells. See, e.g., International Patent Application PCT/SE2010/050947.

Positioning occasion misalignment may also be attributable to inter-frequency RSTD measurements. More particularly, some UEs require measurement gaps in order to perform inter-frequency RTSD measurements. The measurement gaps are configured by an eNodeB upon an indication from a UE. Measurement gaps need to be aligned with PRS positioning occasions of the measured cell. However, according to the standard, the measurement gaps cannot collide with PRS positioning occasions of the cells belonging to the serving carrier. Given that the PRS periodicity is a multiple of the measurement gap periodicity (40 ms, when inter-frequency RSTD measurements are configured), this means that PRS positioning occasions of a neighbour cell cannot collide with PRS positioning occasion of the reference cell. So, in networks supporting inter-frequency RSTD measurements, PRS positioning occasions shall be misaligned between cells on the serving carrier and another carrier. This implicitly means that PRS positioning occasions shall be misaligned among all carriers that may appear in the same assistance data message for a UE, since different UEs may be served by different cells. Nonetheless, PRS positioning occasions will typically be fully or partially aligned in cells operating on the same frequency. With this requirement, there is no reason to require PRS positioning occasion to be the same on all frequencies.

In view of these different timing possibilities for PRS, assistance data provided to a UE assists the UE to determine at least the relationship between the timing of different PRS (e.g., relative to the timing of PRS for the reference cell). For example, the following parameters specified in 3GPP TS 36.355 may be used for determining the timing relation between PRS signals received in the first subframes of the positioning occasions of two cells: (a) slotNumberOffset; (b) prs-SubframeOffset; (c) expectedRSTD; (d) expectedRSTD-Uncertainty; (e) prs-ConfigurationIndex. Then, based on muting information (prs-MutingInfo), the UE also can determine in which positioning occasions the UE is supposed to measure.

Nonetheless, known approaches for employing assistance data remain insufficient for supporting cell-specific PRS configurations. Indeed, practical scenarios may arise where known approaches cause a UE to incorrectly determine the timing relation between a positioning occasion of one cell and a positioning occasion in another cell. Indeed, in such a scenario, one timing relation appears correct to the node generating the assistance data, and a different timing relation appears correct to the UE receiving the assistance data. This ambiguity in which timing relation is correct leads to the UE's incorrect determination.

The current RSTD reporting delay requirements are defined as a function of $T_{PRS}$ (see e.g. [3GPP TS 36.133, Section 8.1.2.5, E-UTRAN Intra-Frequency OTDOA Measurements] or [3GPP TS 36,133, Section 8.1.2.6, E-UTRAN Inter-Frequency OTDOA Measurements] and the corresponding test specification sections). However, it is not clear periodicity of which cell is meant, e.g., the reference or any of the neighbor cells in the same assistance data. It has been proposed to specify requirements with respect to the largest PRS periodicity for cells in the assistance data, which is, however, the worst-case assumption. Which assumption shall apply is still unclear in the standard, if different periodicities are to be supported.

Still further, when the configured PRS periodicity of the reference cell is larger than that of a neighbor cell, then with the current standard there may be UE misbehavior which may lead to accuracy loss, since the UE may be implemented so that it measures in the same number of positioning occasions for neighbor cells as for the reference cell, although the requirements may apply to the neighbor cell PRS periodicity.

Although the above problems have primarily been discussed in the context of certain wireless systems and certain positioning methods, these problems extend to other systems and other methods as well. Indeed, with Open Mobile Alliance (OMA) LPP extension (LPPe), the assistance data is enhanced with the possibility to assist a larger range of positioning methods. For example, the assistance data may also be provided for E-CID or other methods of other radio access technologies (RATs), e.g. OTDOA UTRA or E-OTD GSM, or other PLMN networks.

SUMMARY

One or more embodiments herein advantageously resolve timing ambiguities associated with when a UE is to perform assisted positioning measurements. Broadly described, a UE receives assistance data that indicates positioning occasion periodicities of at least a first cell and a reference cell, and that indicates a positioning occasion timing offset between the first cell and the reference cell. The UE selectively performs signal detection at one or more of a plurality of candidate timing offsets surrounding the indicated positioning occasion timing offset, to determine which candidate timing offset has the greatest probability of being the actual positioning occasion timing offset between the first cell and the reference cell. The UE may then perform positioning measurements with respect to the first cell based on the candidate timing offset determined as most likely being the actual timing offset, rather than necessarily performing those measurements based on the offset indicated in the assistance data.

Of course, performing signal detection at multiple times in this way adds complexity at the UE. At least some embodiments therefore advantageously minimize this complexity by intelligently prioritizing performance of signal detection at those candidate timing offsets most likely to be the actual timing offset. For example, the UE may prioritize performance of signal detection at candidate timing offsets that are closer to the indicated offset, such as by performing ordered signal detection until the UE detects a candidate offset that exceeds some threshold probability. As another example, the UE may simply perform signal detection at a predetermined subset of candidate timing offsets that includes those candidate offsets that are closest to the indicated offset and then select the candidate offset with the greatest probability.

Still other embodiments herein minimize complexity at the UE by selectively performing the above signal detection only if the actual positioning occasion timing offset cannot be deduced in some other way. If, for example, the UE has or can obtain predefined information regarding transmission interval timing of the first cell and the reference cell, the UE may deduce the actual positioning occasion timing offset from that information rather than performing signal detection.

One or more other embodiments herein address problems arising because the positioning occasion periodicity of the reference cell is larger than that of another cell. In this case, the UE identifies when a positioning occasion of the first cell will first occur after the next positioning occasion of the reference cell, according to the positioning occasion timing offset indicated in the assistance data. The UE then determines when other positioning occasions of the first cell will occur, based on that identification and the positioning occasion periodicity of the first cell indicated in the assistance data.

In doing so, the UE may advantageously utilize all of the first cell's positioning occasions for positioning measurements, rather than just those occurring at the larger periodicity of the reference cell. Indeed, in at least some embodiments, responsive to determining when these other positioning occasions of the first cell will occur, the UE times assisted positioning measurements for the first cell based on that determination. The UE thereby performs assisted positioning measurements during one or more positioning occasions of the first cell that occur before the next positioning occasion of the reference cell.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 illustrates a data structure for the provideAssistanceData element specified by prior art LTE standards.

FIG. 4 illustrates a data structure for the OTDOA-ProvideAssisianceData element specified by prior art LTE standards.

DETAILED DESCRIPTION

Figure 1:
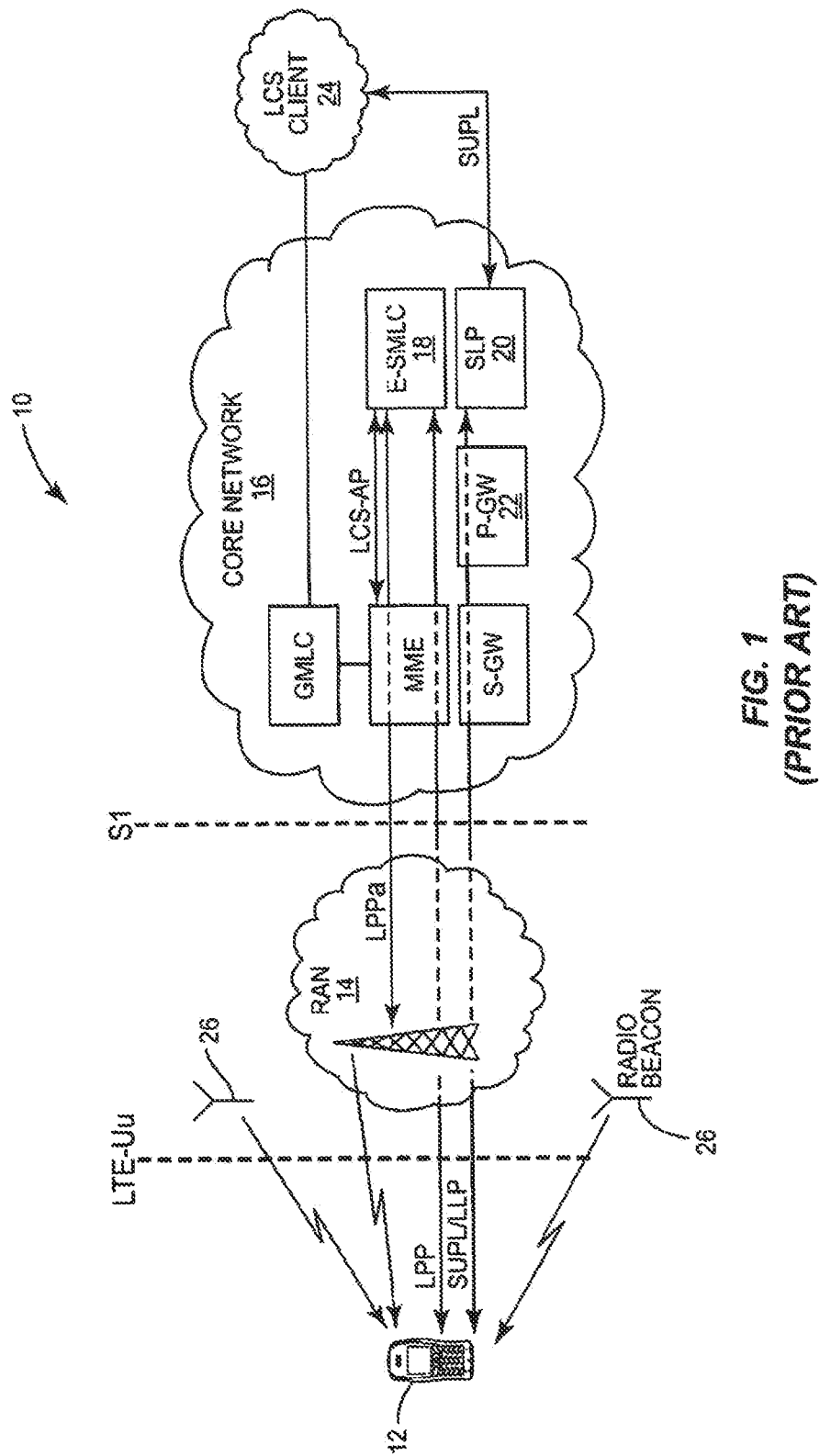
FIG. 1 is a block diagram of an LTE system configured to determine the geographic position of a user equipment.
Figure 2:
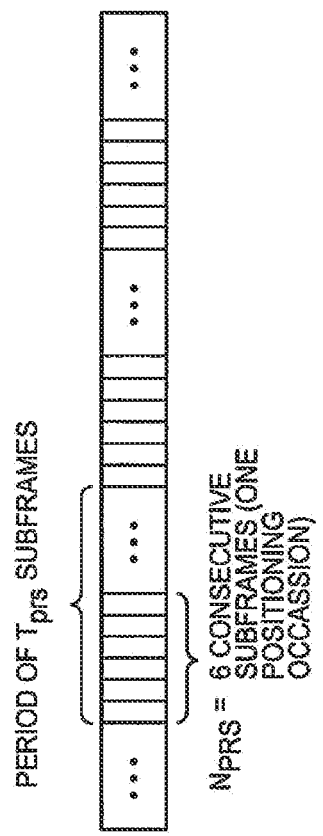
FIG. 2 illustrates the structure and timing of positioning reference signals in an LTE system.

FIG. 2 depicts a simplified example of wireless communication network 30 according to one or more embodiments. As shown, the network 30 includes a Radio Access Network (RAN) 32, a Core Network (CN) 34, and one or more user equipment (UE) 36. The RAN 32 and CN 34 enable a UE 36 to access one or more external networks 38, such as the Public Switched Telephone Network (PSTN) or the Internet.

The RAN 32 includes a number of base stations 40 that are geographically distributed across the wide geographic area served by the system 30. Each base station 40 provides radio coverage for one or more respective portions of that geographic area, referred to as cells 42. As shown, for example, base station 40-1 serves UEs 36 within cell 42-1, base station 40-2 serves UEs 36 within cell 42-2, and so on. Because of this, a UE 36 may move within or between cells 42 and may communicate with one or more base stations 40 at any given position.

Figure 5:
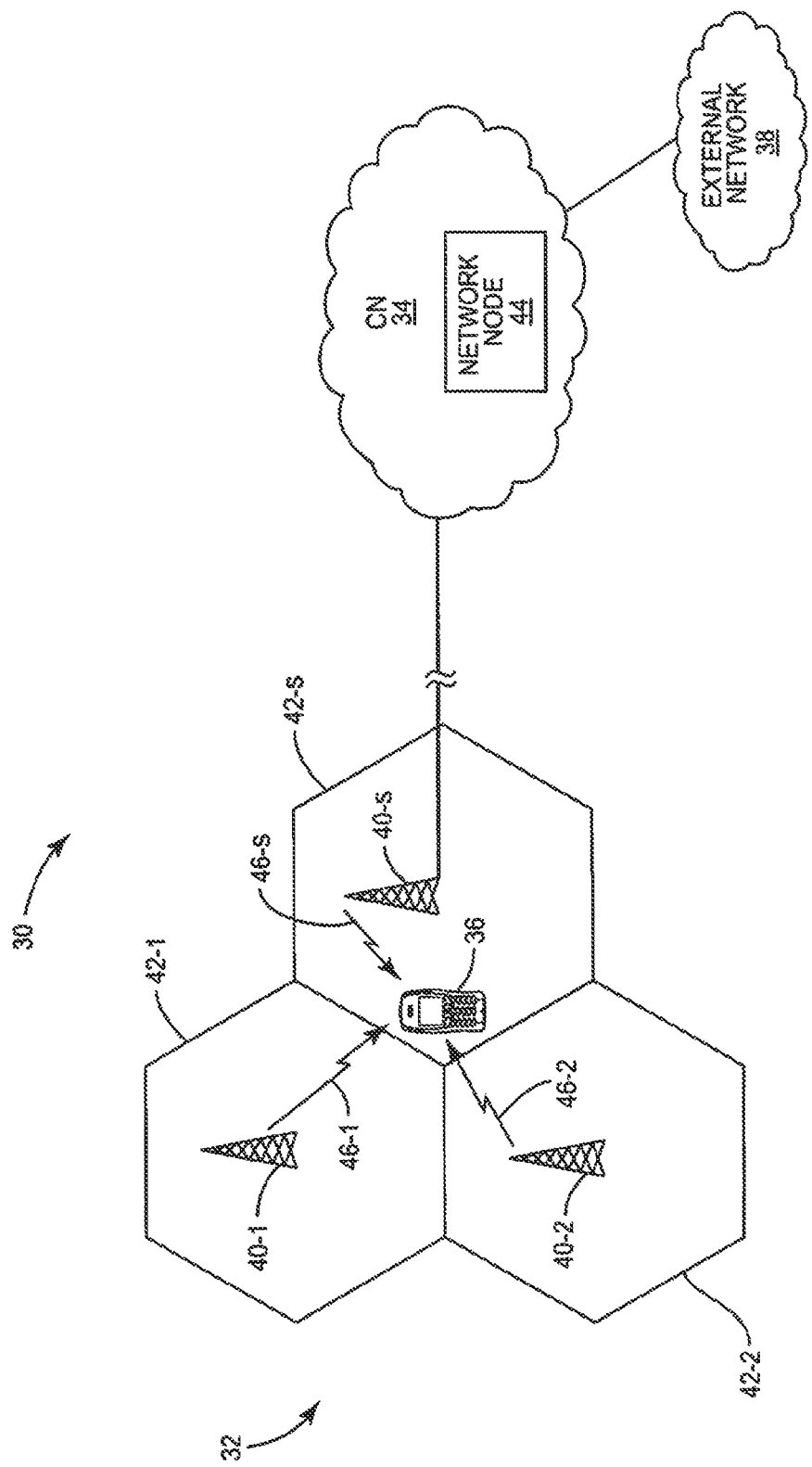
FIG. 5 is a block diagram of a wireless communication network that includes a network node configured according to one or more embodiments.

In this regard. FIG. 5 depicts a particular UE 36 that, at its current position, is served by base station 40-s. Thus, from the perspective of this UE 36, base station 40-s is the serving base station and cell 42-s is the serving cell. The other cells 42-1 and 42-2 physically neighbor the serving cell 42-s in the sense that they are geographically adjacent to the serving cell 42-s. These cells 42-1 and 42-2 are thus appropriately referred to as neighboring cells.

Each of the cells 42 (via its base station 40) periodically transmits positioning signals 46 during respective positioning occasions of those cells 42. A positioning signal 46 as used herein is specifically designed (e.g., with good signal quality) to be a signal on which a UE performs positioning measurements. And a positioning occasion of a cell 42 as used herein refers a periodic interval of time during which that cell transmits a positioning signal for measurement by a UE 36. Such measurements are to be used by the UE 36 itself, or some other network node 44 in the core network 35 (e.g., a positioning node), for determining the UE's geographic position.

In some embodiments, for example, such positioning measurements comprise timing measurements. In such a case, a UE may measure timing differences (e.g., RSTD, Rx-Tx, or TA) between different positioning signals 46 received from different cells 42. These timing differences are then used to estimate the UE's position with respect to the different cells 42.

Regardless of the particular type of positioning measurements, though, one of the cells 42 serves as a so-called reference cell for the UE's measurements. Positioning measurements performed with respect to this reference cell, as the name implies, serves as a reference for measurements performed with respect to other cells 42. For instance, where the positioning measurements are timing measurements, the UE 36 measures the difference between the time at which the UE 36 receives a positioning signal from the reference cell and the time at which the UE 36 receives a positioning signal from another cell 42. Any cell 42 may serve as the reference cell, including any one of the neighbor cells 42-1 and 42-2 or the serving cell 42-s.

To help the UE 36 perform these positioning measurements, the network node 44 transmits so-called assistance data to the UE 36. This assistance data indicates the positioning occasion timing for the cells 42 on which the UE 36 is to perform the positioning measurements. With knowledge of this positioning occasion timing, the UE 36 can time its measurement of each cell 42 to coincide with the times at which the cell 42 actually transmits its positioning signals 46.

Further contributing to the role played by the reference cell, the assistance data more particularly indicates the positioning occasion timing for any given cell 42 relative to the positioning occasion timing for the reference cell. For example, the assistance data may indicate when a positioning occasion of a particular cell is to occur as a timing offset from when a positioning occasion of the reference cell is to occur.

Figure 6:
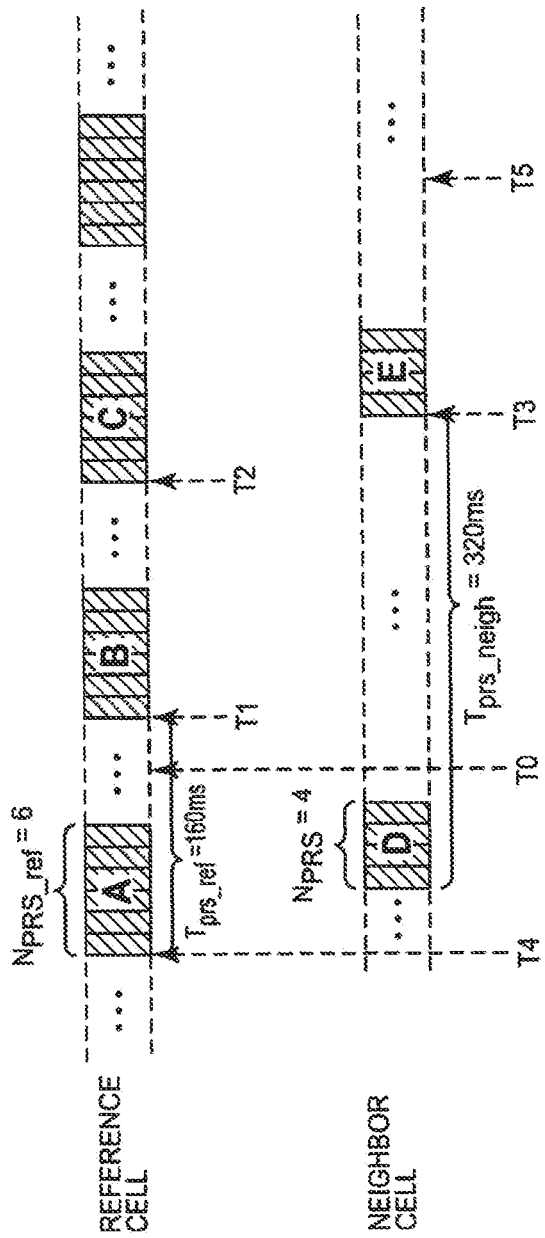
FIG. 6 illustrates positioning occasion timing of a reference cell and a neighbor cell according to one example.

While indicating positioning occasion timing relative to the reference cell in this way proves efficient, it adds complexities in some contexts. Consider, for example, the context shown in FIG. 6, wherein the positioning occasion periodicity of the reference cell ($T_{prs\_ref}$=160 ms) is smaller than that of a neighbor cell 42 ($T_{prs\_neigh}$=320 ms) indicated in the assistance data. If the network node 44 were to generate the assistance data at time T0, the node 44 would calculate that the timing offset between the next positioning occasion of the reference cell (occasion B, starting at time T1) and the next positioning occasion of the neighbor cell (occasion E, starting at time T3) has a value of offset=T1−T3. Yet, if the UE 36 does not receive the assistance data until after time T1, the UE 36 could reasonably interpret the received timing offset as being an offset from reference cell positioning occasion C that starts at time T2, rather than T1, because from the UE's perspective the next positioning occasion of the reference cell starts at time T2. In this case, the UE 36 would incorrectly determine that the next positioning occasion E of the neighbor cell starts at time T2+offset=T5, rather than at time T1+offset=T3.

Figure 7:
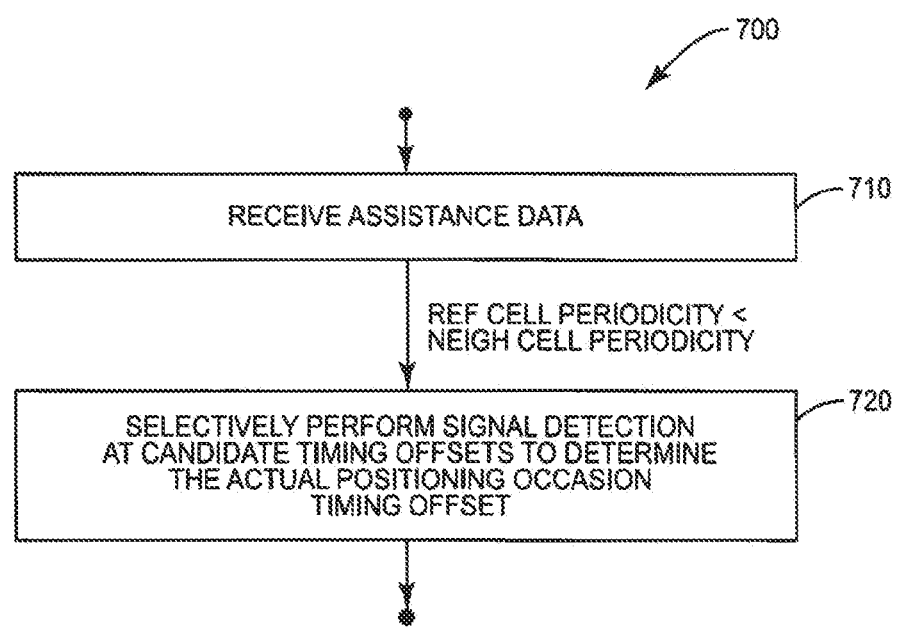
FIG. 7 is a logic flow diagram of a method implemented by a user equipment for performing assisted positioning measurements according to one or more embodiments.

According to one or more embodiments herein, however, a UE 36 advantageously resolves this timing ambiguity by performing the processing 700 in FIG. 7. As shown in FIG. 7, processing 700 includes receiving assistance data that indicates positioning occasion periodicities of at least a first one of the cells 42 and a reference cell, and that indicates a positioning occasion timing offset between the first cell and the reference cell (Block 710). Processing 700 further includes selectively performing signal detection at one or more of a plurality of candidate timing offsets surrounding the indicated positioning occasion timing offset to determine which candidate timing offset has the greatest probability of being the actual positioning occasion timing offset between the first cell and the reference cell (Block 720). Such signal detection may include, for example, correlating signals received at the different candidate timing offsets with expected positioning signals, to determine the degree to which the received signals match positioning signals received from the first cell. Regardless, in some embodiments, processing may then include timing assisted positioning measurements for the first cell based on the candidate timing offset determined as most likely being the actual timing offset, rather than necessarily timing those measurements based on the offset indicated in the assistance data.

As shown in FIG. 7, such processing is conditioned on the positioning occasion periodicity of the reference cell being smaller than that of the first cell. Nonetheless, those skilled in the art will readily appreciate that such processing may also prove advantageous when the positioning occasion periodicity of the reference cell is larger than that of the first cell. At least for ease of illustration, though, embodiments herein are described in the context where the positioning occasion periodicity of the reference cell is indeed smaller than that of the first cell.

Figure 8:
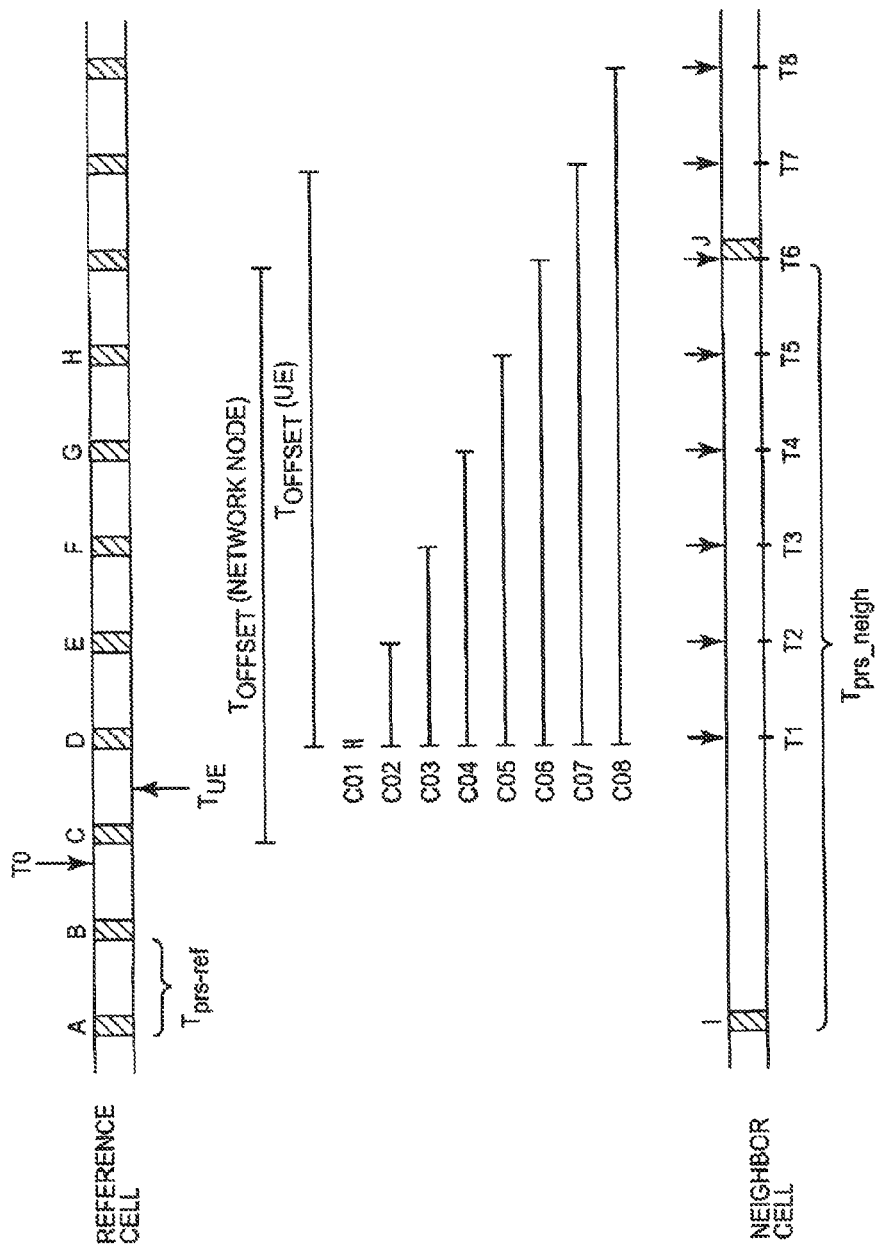
FIG. 8 is an example that illustrates a user equipment's performance of signal detection according to one or more embodiments.

FIG. 8 illustrates a helpful example. As shown in FIG. 8, the reference cell has a positioning occasion periodicity $T_{prs\_ref}$ that is eight times smaller than the positioning occasion periodicity $T_{prs\_neigh}$ of a neighbor cell 42 included in the assistance data received by the UE 36. Indeed, within the time that eight positioning occasions A-H of the reference cell occur, only one positioning occasion I of the neighbor cell 42 occurs. As initially described above, this difference in periodicities fosters ambiguity in the assistance data.

In FIG. 8, for example, assume that the network node 44 generates the assistance data at time T0, in between reference cell positioning occasions B and C. In doing so, the node 44 includes a timing offset $T_{offset}$ in the assistance data to indicate when the next positioning occasion J of the neighbor cell 42 occurs relative to the next positioning occasion of the reference cell. The network node 44 computes this timing offset $T_{offset}$ relative to reference cell positioning occasion C, since from the network node's perspective at time T0 that is the next positioning occasion of the reference cell. However, when the UE 36 receives the timing offset $T_{offset}$ at time $T_{UE}$, reference cell positioning occasion D is the next positioning occasion of the reference cell from the UE's perspective, rather than occasion C. So, if the UE 36 were to simply time its next positioning measurement of the neighbor cell based on the indicated timing offset $T_{offset}$, it would incorrectly time its measurement to occur at time T7, rather than at time T6 when the next positioning occasion J of the neighbor cell 42 actually occurs.

According to advantageous embodiments herein, though, the UE 36 refrains from simply timing its measurements based on the timing offset $T_{offset}$ indicated in the assistance data. Instead, the UE 36 performs signal detection at one or more of a plurality of candidate timing offsets (or just simply candidate offsets, COs) surrounding the indicated offset, to determine which candidate offset is most likely the actual offset. FIG. 8, for example, illustrates candidate offsets 1 through 8 that surround the indicated offset $T_{offset}$ at time T7. Candidate offset 1 corresponds to a neighbor cell positioning occasion occurring at time T1, candidate offset 2 corresponds to a neighbor cell positioning occasion occurring at time T2, candidate offset 3 corresponds to a neighbor cell positioning occasion occurring at time T3, and so on.

In at least some embodiments, the UE 36 computes these candidate offsets 1-8 as a function of the indicated offset $T_{offset}$ and the positioning occasion periodicities indicated for the reference cell and the neighbor cell 42. As one example, the UE 36 may compute the candidate offsets 1-8 according to:

$$\mathrm{mod}(T_{offset}+N*T_{prs\_ref}, T_{prs\_neigh}), \qquad (1)$$

for N between 0 and $$\frac{T_{prs\_neigh}}{T_{prs\_ref}} - 1$$

(where in this example $$\frac{T_{prs\_neigh}}{T_{prs\_ref}} - 1 = 7).$$

Regardless, the UE 36 performs signal detection at one or more of these candidate offsets 1-8 (i.e., for one or more values of N in equation (1)). In this example, signal detection at candidate offset 6 (i.e., for N=7) will reveal that such offset 6 has the greatest probability of being the actual offset, since the neighbor cell actually transmits positioning signals at time T6 during positioning occasion J. The UE 36 will therefore base positioning measurements of the neighbor cell 42 on measurements performed at time T6, rather than on measurements performed at time T7 as indicated in the received assistance data.

Of course, performing signal detection at multiple times in this way adds complexity at the UE 36. At least some embodiments therefore advantageously minimize this complexity by intelligently prioritizing performance of signal detection at those candidate timing offsets most likely to be the actual timing offset. For example, the UE 36 may prioritize performance of signal detection at candidate timing offsets that are closer to the indicated offset $T_{offset}$. Thus, performance of signal detection at the candidate timing offset directly corresponding to the indicated offset (i.e., N=0, which corresponds to time T7 in FIG. 8) is prioritized first. Then, performance of signal detection at candidate offsets on either side of the indicated offset (i.e., N=1, which corresponds to time T8 in FIG. 8, and $$N = \frac{T_{prs\_neigh}}{T_{prs\_ref}} - 1,$$

which corresponds to time T6 in FIG. 8) are prioritized next, and so on.

With signal detection performance prioritized in this way, signal detection is performed at different candidate timing offsets, in order of their priority, until one of those candidate offsets has at least a threshold probability of being the actual offset. When that occurs, the UE 36 may prematurely refrain from performing signal detection at any remaining, lesser-priority candidate offsets, and simply select the candidate offset that exceeded the threshold probability as the offset most likely to be the actual offset. This often proves sufficient since the indicated offset $T_{offset}$ in many practical scenarios is not too far off from the actual offset. This is the case especially in LTE networks, where the signaling delay between the network node 44 and a UE 36 is small and the time synchronization across nodes in the network remains fairly accurate.

Further in this regard, therefore, one or more other embodiments herein simply perform signal detection at a predetermined subset of candidate timing offsets that includes those candidate offsets that are closest to the indicated offset $T_{offset}$ (e.g., for only N=0, 1, and $$\frac{T_{prs\_neigh}}{T_{prs\_ref}} - 1).$$

After performing signal detection for only this closest subset of candidate offsets, the UE 36 selects the candidate offset with the greatest probability of being the actual offset as the offset on which to base its positioning measurements. Thus, rather than performing ordered signal detection to detect the candidate offset that exceeds some threshold probability, these embodiments perform limited signal detection to detect the candidate offset with the greatest probability.

Still other embodiments herein minimize complexity at the UE 36 by selectively performing the above signal detection only if the actual positioning occasion timing offset cannot be deduced in some other way. More particularly, the UE 36 in some embodiments determines whether or not it has or can obtain predefined information regarding transmission interval timing of the neighbor cell 42 and the reference cell. Such transmission interval timing may comprise, for example, the timing offset between the first system frame number (SFN 0) of the reference cell and the first system frame number (SFN 0) of the neighbor cell 42. Regardless, if the UE 36 does not have and cannot obtain this predefined information, the UE 36 performs the above mentioned signal detection. Otherwise, if the UE 36 has or can obtain this predefined information, the UE 36 deduces the actual positioning occasion timing offset from that information.

For example, where the network 10 is a synchronous network, this predefined information from which the UE 36 can deduce the actual positioning occasion timing offset comprises an offset, if any, between transmission intervals of the neighbor and reference cells, and a current transmission interval number for either the neighbor or reference cell (where the transmission interval numbers for the neighbor and reference cells are the same, since the network 10 is synchronous). The UE 36 can deduce the actual positioning occasion timing offset from this information since the timing offset indicated in the assistance data indicates an offset from the first transmission interval number (i.e., SFN 0).

By contrast, where the network 10 is an asynchronous network, this predefined information from which the UE 36 can deduce the actual positioning occasion timing offset simply comprises a current transmission interval number for both the neighbor and reference cells (where those interval numbers may be different in an asynchronous network). Here, an asynchronous network includes even frame-aligned and sub-frame-aligned networks that are not SFN-aligned.

Note that the UE 36 may not need to obtain this information explicitly for each cell 42 included in the assistance data. Indeed, if the positioning occasions of multiple cells are aligned (e.g., cells on the same frequency), the UE 36 may only obtain the information explicitly for one of those aligned cells and then apply that information to the other aligned cells.

Also note that the UE 36 may obtain the information in at least some embodiments within the assistance data itself, for at least some of the cells 42. In LTE embodiments, for example, the UE 36 may obtain the information within OTDOA assistance data, via SUPL. LPP, or LPPe, when the information is different from that of other cells for which the information is known (e.g., the serving cell or the reference cell).

While in the above embodiments the UE 36 resolved timing ambiguities arising because the positioning occasion periodicity of the reference cell was smaller than that of another cell, in other embodiments herein the UE 36 addresses problems arising because the positioning occasion periodicity of the reference cell is larger than that of another cell. Consider, for example, the context shown in FIG. 9, where the positioning occasion periodicity of the reference cell ($T_{prs\_ref}$) is larger than that of a neighbor cell 42 indicated in the assistance data ($T_{prs\_neigh}$). In this case, the UE 36 receives the assistance data at time $T_{UE}$, between reference cell positioning occasions A and B and between neighbor cell positioning occasions C and D. This received assistance data includes a timing offset $T_{offset}$ that indicates when the next positioning occasion of the neighbor cell 42 occurs relative to the next positioning occasion of the reference cell. Since the next positioning occasion of the reference cell is occasion B, if the UE 36 were to simply time its next positioning measurement of the neighbor cell 42 based on the received timing offset $T_{offset}$, it would only perform a positioning measurement during neighbor cell positioning occasion H (since that is the next neighbor cell positioning occasion that occurs after the reference cell positioning occasion B). The UE 36 would therefore incorrectly skip over performing positioning measurements during neighbor cell positioning occasions D, E, F, G, I, J, K, and so on.

Figure 10:
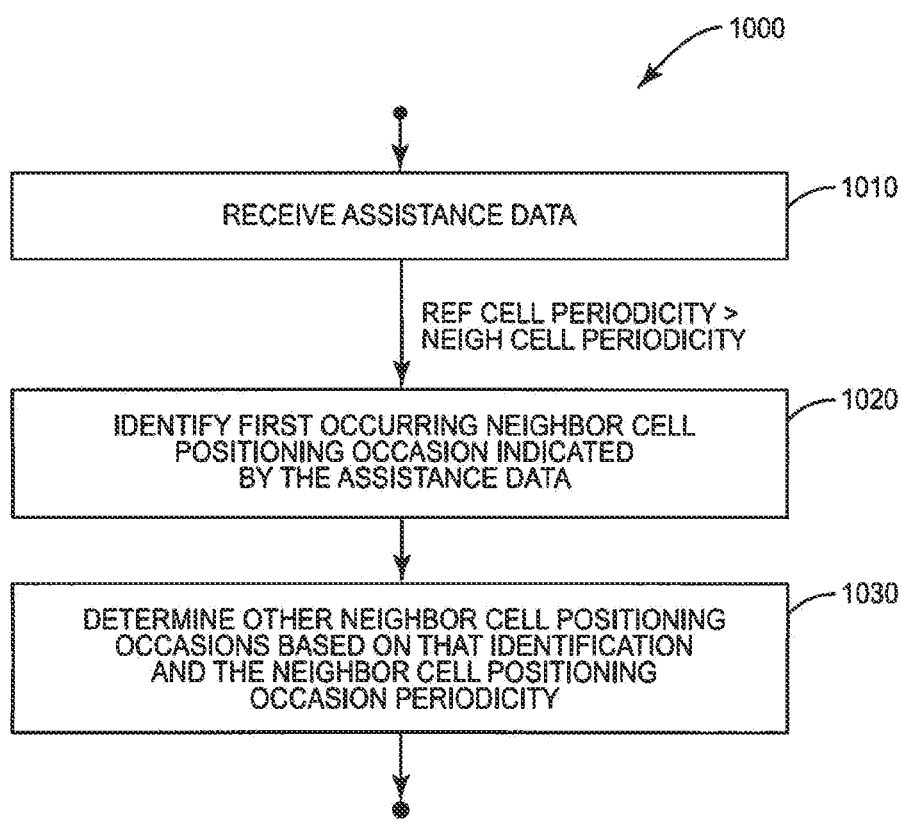
FIG. 10 is a logic flow diagram of a method implemented by a user equipment for performing assisted positioning measurements according to one or more other embodiments.

According to one or more embodiments herein, however, a UE 36 advantageously addresses this problem by performing the processing 1000 in FIG. 10. As shown in FIG. 10, processing 1000 at the UE 36 includes receiving assistance data that indicates positioning occasion periodicities of at least a first one of the cells 42 and a reference cell, and that indicates a positioning occasion timing offset $T_{offset}$ between the first cell and the reference cell (Block 1010). When the positioning occasion periodicity of the reference cell is larger than that of the first cell, processing 1000 further includes identifying when a positioning occasion of the first cell 42 will first occur after the next positioning occasion of the reference cell, according to the positioning occasion timing offset $T_{offset}$ indicated in the assistance data (Block 1020). Processing then includes determining when other positioning occasions of the first cell will occur, based on that identification and the positioning occasion periodicity of the first cell indicated in the assistance data (Block 1030).

By performing the above processing, the UE 36 may advantageously utilize all of the first cell's positioning occasions for positioning measurements, rather than just those occurring at the larger periodicity of the reference cell. Indeed, in at least some embodiments, responsive to determining when these other positioning occasions of the first cell will occur, the UE 36 times assisted positioning measurements for the first cell based on that determination. In doing so, the UE 36 performs assisted positioning measurements during one or more positioning occasions of the first cell that occur before the next positioning occasion of the reference cell.

Figure 9:
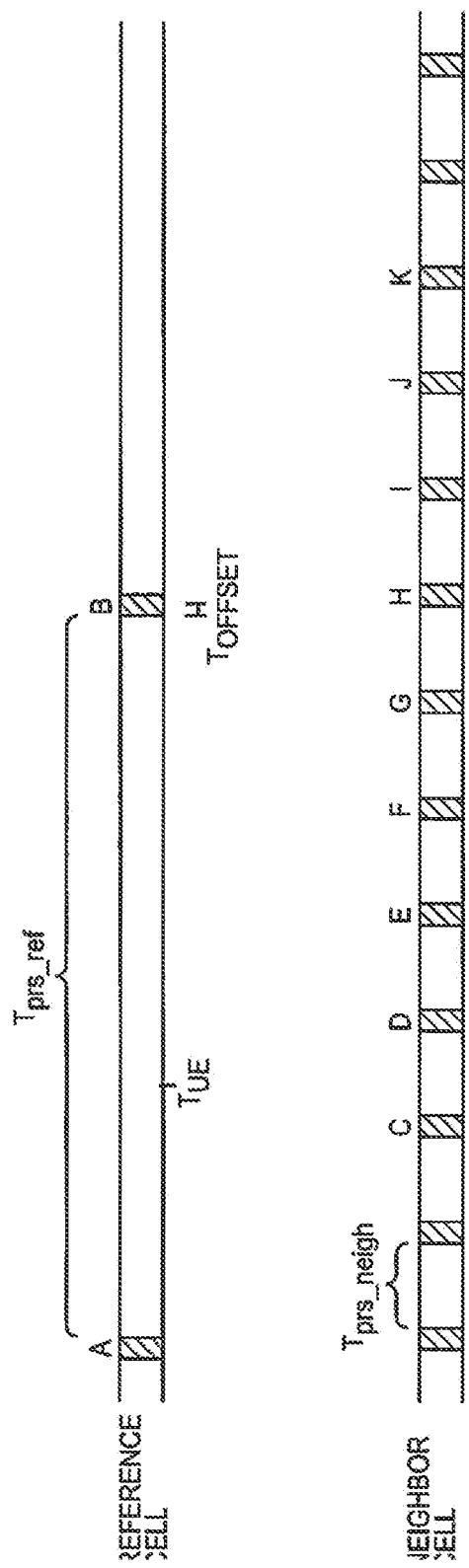
FIG. 9 is an example that illustrates a user equipment's positioning occasion identification according to one or more embodiments.

Consider again the example in FIG. 9 for purposes of illustrating these embodiments. When the UE 36 receives the assistance data at time $T_{UE}$, the UE 36 utilizes the received timing offset $T_{offset}$ to identify positioning occasion H as being the neighbor cell positioning occasion that first occurs after the next reference cell positioning occasion (occasion B). The UE 36 then determines when other neighbor cell positioning occasions occur (e.g., occasions D, E, F, G, I, J, K, and so on), based on the positioning occasion periodicity of the neighbor cell 42 indicated in the assistance data ($T_{prs\_neigh}$). Such may entail, for instance, extrapolating out from neighbor cell positioning occasion H, in both directions, at time intervals of $T_{prs\_neigh}$, to identify when these other neighbor cell positioning occasions occur, As a result, the UE 36 is able to perform positioning measurements during neighbor cell positioning occasions D, E, F, and G, even though those occasions occur before the next reference cell positioning occasion B.

Note of course that at least in some embodiments the above approaches are UE-specific. That is, while some UEs 36 may perform the above processing, others may not. Moreover, while some UEs 36 may perform the processing in FIG. 7 for performing assisted positioning measurements at a given time, since the reference cell periodicity for those UEs 36 is smaller than another cell included in the assistance data, other UEs 36 may perform the processing in FIG. 10 for performing assisted positioning measurements at the same time, since the reference cell periodicity for those UEs 36 is greater than another cell included in the assistance data. The UE-specific nature of the approach is therefore attributable to the fact that different cells 42 may be included in the assistance data for different UEs 36, meaning that the reference cell periodicity for different UEs 36 may relate to the periodicity of other cells 42 differently, Of course, also note that the same UE 36 may perform the both processing in FIGS. 7 and 10, at different times, depending on the current reference cell's relation to other cells in the assistance data.

Those skilled in the art will also understand that the above mentioned positioning signals may be transmitted on the same or different frequencies across the cells 42. That is, the signals may be inter-frequency or intra-frequency. The above embodiments may therefore be implemented by UEs that need measurement gaps to perform positioning measurements on inter-frequency signals, as well as by UEs that do not need such gaps. Indeed, standardized operation of a UE 36 may dictate that measurement gaps be configured for such positioning measurements, even if the UE 36 is technically capable of performing the measurements without them. One such UE 36 may be, for instance, a device capable of carrier aggregation.

Those skilled in the art will further appreciate that the UE 36 described herein may be any wireless node capable of performing positioning measurements on positioning signals 46. In this regard, the UE 36 may be a mobile terminal (e.g., a smart phone, a personal digital assistant, a laptop, etc.), a sensor, a mobile relay, or even a small base station or fixed relay that is being positioned, e.g., at setup. In LTE embodiments, for instance, the UE 36 comprises any LCS target.

Moreover, the above embodiments have not been described in the context of any particular type of wireless communication system (i.e., RAT). In this regard, no particular communication interface standard is necessary for practicing the present invention. That is, the wireless communication network 30 may be any one of a number of standardized system implementations in which a UE 36 can perform positioning measurements.

Nonetheless, as one particular example, the network 30 may implement LTE or LTE-based standards, In this case, the network node 44 may comprise a positioning node that implements a positioning platform. If the platform is implemented in the user plane, the network node 44 is an SLP node, and if the platform is implemented in the control plane, the node 44 is an E-SMLC node. Moreover, signaling of the positioning result between an E-SMLC node and an LCS Client may be transferred via multiple nodes (e.g., via MME and GMLC). Note also that LTE FDD and LTE TDD are considered as different RATs, and two LTE networks are also considered as two different LTE RATs, Further, positioning signals 46 as referred to above comprise Positioning Reference Signals (PRS) in LTE. Finally, the node 44 generates assistance data by including a prs-ConfigurationIndex element in the assistance data to indicate the positioning occasion periodicity of the reference cell, and by including a prs-SubframeOffset element in the assistance data to indicate the timing offset for one or more other cells relative to the reference cell.

Finally, the above embodiments may employ any number of positioning method types besides those examples given above. The measurements may include, for instance, Reference Signal Time Difference (RSTD) measurements for Observed Time Difference of Arrival (OTDOA) positioning. However, other types of timing measurements are just as applicable.

Figure 11:
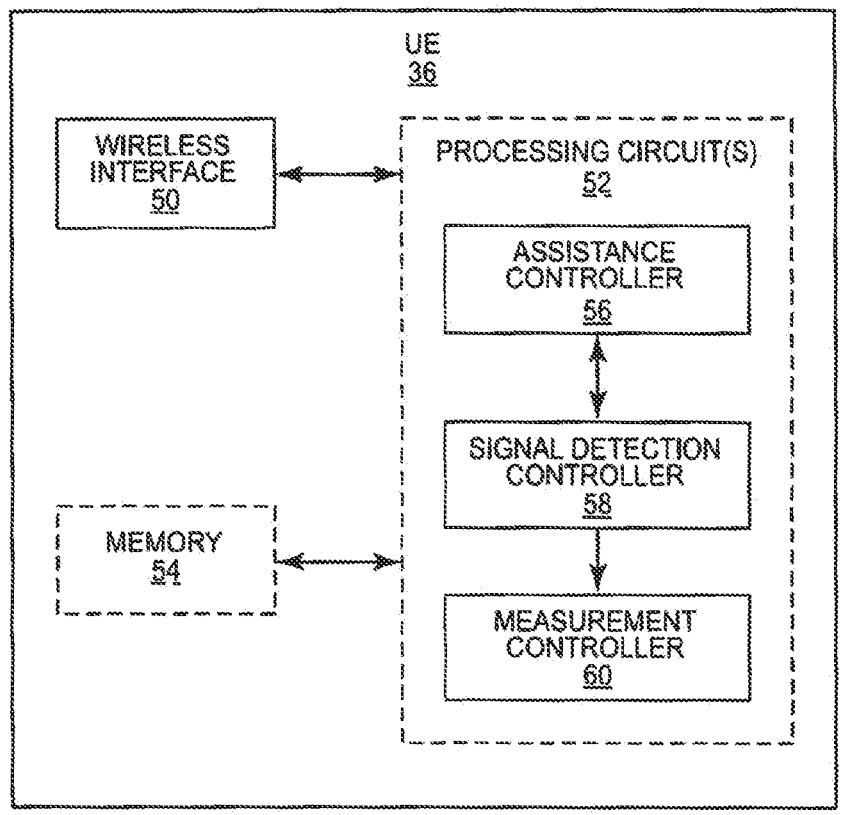
FIG. 11 is a block diagram of a user equipment configured according to one or more embodiments.

In view of the above described variations and modifications, those skilled in the art will appreciate that the UE 36 herein generally is configured according to the apparatus shown in FIG. 11. As shown in FIG. 11, the UE 36 includes a wireless interfaces 50, one or more processing circuits 52, and a memory 54. The wireless interface is configured to communicatively couple the UE 36 to the network node 44, via one or more intermediate nodes such as base stations 40 that directly communicate with the UE 36 over an air interface. The one or more processing circuits 52 may be configured to perform the processing shown in either FIG. 7 or FIG. 10.

As shown, the one or more processing circuits are configured to perform the processing shown in FIG. 7 and include an assistance controller 56, a signal detection controller 58, and a measurement controller 60. The assistance controller 56 is configured to receive assistance data that indicates positioning occasion periodicities of at least a first one of the cells 42 and a reference cell, and that indicates a positioning occasion timing offset between the first cell and the reference cell. The signal detection controller is correspondingly configured to selectively perform signal detection at one or more of a plurality of candidate timing offsets surrounding the indicated positioning occasion timing offset to determine which candidate timing offset has the greatest probability of being the actual positioning occasion timing offset between the first cell and the reference cell. Finally, in at least some embodiments, the measurement controller 60 times assisted positioning measurements for the first cell based on the candidate timing offset determined as most likely being the actual timing offset, rather than necessarily timing those measurements based on the offset indicated in the assistance data.

The one or more processing circuits 52 may alternatively or additionally be configured to perform the processing shown in FIG. 7. In this case, the circuit(s) 52 may or may not include the signal detection controller 58. Regardless, the measurement controller 60 in such embodiments is configured, when the positioning occasion periodicity of the reference cell is larger than that of the first cell, to identify when a positioning occasion of the first cell 42 will first occur after the next positioning occasion of the reference cell, according to the positioning occasion timing offset indicated in the assistance data received by the assistance controller 56. Finally, the measurement controller 60 is configured to determine when other positioning occasions of the first cell will occur, based on that identification and the positioning occasion periodicity of the first cell indicated in the assistance data.

Of course, those skilled in the art will appreciate that the various "circuits" described may refer to a combination of analog and digital circuits, and/or one or more processors configured with software stored in memory 54 and/or firmware stored in memory 54 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a user equipment in a wireless communication network for performing assisted positioning measurements on positioning signals periodically transmitted by one or more cells during respective positioning occasions of those cells, the method comprising:
   receiving assistance data that indicates positioning occasion periodicities of at least a first one of said cells and a reference cell, and that indicates a positioning occasion timing offset between the first cell and the reference cell; and
   performing signal detection at one or more of a plurality of candidate timing offsets surrounding the indicated positioning occasion timing offset to determine which candidate timing offset has the greatest probability of being the actual positioning occasion timing offset between the first cell and the reference cell.

2. The method of claim 1, wherein said performance of signal detection comprises computing the plurality of candidate timing offsets as a function of said positioning occasion timing offset and said positioning occasion periodicities.

3. The method of claim 1, wherein said performance of signal detection comprises prioritizing performance of signal detection at candidate timing offsets that are closer to said positioning occasion timing offset.

4. The method of claim 1, wherein said performance of signal detection comprises performing signal detection at a predetermined subset of candidate timing offsets including those candidate timing offsets that are closest to said positioning occasion timing offset.

5. The method of claim 1, further comprising determining whether or not the user equipment has or can obtain predefined information regarding transmission interval timing of the first cell and the reference cell, and wherein said performing comprises performing said signal detection if the user equipment does not have and cannot obtain said predefined information, and wherein the method further comprises, if the user equipment has or can obtain said predefined information, deducing the actual positioning occasion timing offset from that predefined information.

6. The method of claim 5, wherein said predefined information includes at least one of:
   an offset, if any, between transmission intervals of the first and reference cells, and a current transmission interval number for either the first or reference cell; or
   a current transmission interval number for both the first and reference cells.

7. The method of claim 5, wherein said receiving comprises receiving assistance data that includes said predefined information.

8. The method of claim 1, further comprising, responsive to determining the actual positioning occasion timing offset, timing assisted positioning measurements for the first cell based on that actual positioning occasion timing offset.

9. The method of claim 1, further comprising, when the positioning occasion periodicity of the reference cell is larger than that of the first cell:
   identifying when a positioning occasion of the first cell will first occur after the next positioning occasion of the reference cell, according to the positioning occasion timing offset indicated in the assistance data; and
   determining when other positioning occasions of the first cell will occur, based on said identification and the positioning occasion periodicity of the first cell indicated in the assistance data.

10. The method of claim 9, further comprising, responsive to determining when said other positioning occasions of the first cell will occur, timing assisted positioning measurements for the first cell based on that determination, including performing assisted positioning measurements during one or more positioning occasions of the first cell that occur before the next positioning occasion of the reference cell.

11. The method of claim 1, further comprising determining whether the positioning occasion periodicity of the reference cell is smaller than that of the first cell, and wherein said performing comprises performing said signal detection when the positioning occasion periodicity of the reference cell is smaller than that of the first cell.

12. The method of claim 1, wherein said positioning measurements comprise Reference Signal Time Difference (RSTD) measurements for Observed Time Difference of Arrival (OTDOA) positioning.

13. The method of claim 1, wherein the wireless communication network comprises a Long Term Evolution (LTE) network, wherein the positioning signals comprise Positioning Reference Signals (PRS), wherein prs-ConfigurationIndex elements in the assistance data indicate the positioning occasion periodicities of the first cell and the reference cell, and wherein a prs-SubframeOffset element in the assistance data indicates said positioning occasion timing offset.

14. A method implemented by a user equipment in a wireless communication network for performing assisted positioning measurements on positioning signals periodically transmitted by one or more cells during respective positioning occasions of those cells, the method comprising:
- receiving assistance data that indicates positioning occasion periodicities of a first one of said cells and a reference cell, and that indicates a positioning occasion timing offset between the first cell and the reference cell;
- determining whether the positioning occasion periodicity of the reference cell is larger than that of the first cell; and
- responsive to determining that the positioning occasion periodicity of the reference cell is larger than that of the first cell, identifying when a positioning occasion of the first cell will first occur after the next positioning occasion of the reference cell, according to the positioning occasion timing offset indicated in the assistance data, and determining when other positioning occasions of the first cell will occur, based on said identification and the positioning occasion periodicity of the first cell indicated in the assistance data.

15. The method of claim 14, further comprising, responsive to determining when said other positioning occasions of the first cell will occur, timing assisted positioning measurements for the first cell based on that determination, including performing assisted positioning measurements during one or more positioning occasions of the first cell that occur before the next positioning occasion of the reference cell.

16. The method of claim 14, wherein said positioning measurements comprise Reference Signal Time Difference (RSTD) measurements for Observed Time Difference of Arrival (OTDOA) positioning.

17. The method of claim 14, wherein the wireless communication network comprises a Long Term Evolution (LTE) network, wherein the positioning signals comprise Positioning Reference Signals (PRS), wherein prs-ConfigurationIndex elements in the assistance data indicate the positioning occasion periodicities of the first cell and the reference cell, and wherein a prs-SubframeOffset element in the assistance data indicates said positioning occasion timing offset.

18. A user equipment in a wireless communication network configured to perform assisted positioning measurements on positioning signals periodically transmitted by one or more cells during respective positioning occasions of those cells, the user equipment comprising:
- a wireless interface configured to communicatively couple the user equipment to the wireless communication network; and
- one or more processing circuits configured to:
  - receive, via the wireless interface, assistance data that indicates positioning occasion periodicities of at least a first one of said cells and a reference cell, and that indicates a positioning occasion timing offset between the first cell and the reference cell; and
  - perform signal detection at one or more of a plurality of candidate timing offsets surrounding the indicated positioning occasion timing offset to determine which candidate timing offset has the greatest probability of being the actual positioning occasion timing offset between the first cell and the reference cell.

19. The user equipment of claim 18, wherein the one or more processing circuits are configured to perform signal detection by computing the plurality of candidate timing offsets as a function of said positioning occasion timing offset and said positioning occasion periodicities.

20. The user equipment of claim 18, wherein the one or more processing circuits are configured to perform signal detection by prioritizing performance of signal detection at candidate timing offsets that are closer to said positioning occasion timing offset.

21. The user equipment of claim 18, wherein the one or more processing circuits are configured to perform signal detection by performing signal detection at a predetermined subset of candidate timing offsets including those candidate timing offsets that are closest to said positioning occasion timing offset.

22. The user equipment of claim 18, wherein the one or more processing circuits are configured to:
- determine whether or not the user equipment has or can obtain predefined information regarding transmission interval timing of the first cell and the reference cell;
- perform said signal detection if the user equipment does not have and cannot obtain said predefined information; and
- if the user equipment has or can obtain said predefined information, deduce the actual positioning occasion timing offset from that predefined information.

23. The user equipment of claim 22, wherein said predefined information includes at least one of:
- an offset, if any, between transmission intervals of the first and reference cells, and a current transmission interval number for either the first or reference cell; or
- a current transmission interval number for both the first and reference cells.

24. The user equipment of claim 22, wherein the one or more processing circuits are configured to receive assistance data that includes said predefined information.

25. The user equipment of claim 18, wherein the one or more processing circuits are configured, responsive to determining the actual positioning occasion timing offset, to time assisted positioning measurements for the first cell based on that actual positioning occasion timing offset.

26. The user equipment of claim 18, wherein the one or more processing circuits are configured, when the positioning occasion periodicity of the reference cell is larger than that of the first cell, to:
- identify when a positioning occasion of the first cell will first occur after the next positioning occasion of the reference cell, according to the positioning occasion timing offset indicated in the assistance data; and
- determine when other positioning occasions of the first cell will occur, based on said identification and the positioning occasion periodicity of the first cell indicated in the assistance data.

27. The user equipment of claim 26, wherein the one or more processing circuits are configured, responsive to determining when said other positioning occasions of the first cell will occur, to time assisted positioning measurements for the first cell based on that determination, including performing assisted positioning measurements during one or more positioning occasions of the first cell that occur before the next positioning occasion of the reference cell.

28. The user equipment of claim 18, wherein the one or more processing circuits are configured to determine whether the positioning occasion periodicity of the reference cell is smaller than that of the first cell, and perform said signal detection when the positioning occasion periodicity of the reference cell is smaller than that of the first cell.

29. The user equipment of claim 18, wherein said positioning measurements comprise Reference Signal Time Difference (RSTD) measurements for Observed Time Difference of Arrival (OTDOA) positioning.

30. The user equipment of claim 18, wherein the wireless communication network comprises a Long Term Evolution (LTE) network, wherein the positioning signals comprise Positioning Reference Signals (PRS), wherein prs-ConfigurationIndex elements in the assistance data indicate the positioning occasion periodicities of the first cell and the reference cell, and wherein a prs-SubframeOffset element in the assistance data indicates said positioning occasion timing offset.

31. A user equipment in a wireless communication network configured to perform assisted positioning measurements on positioning signals periodically transmitted by one or more cells during respective positioning occasions of those cells, the user equipment comprising:
   a wireless interface configured to communicatively couple the user equipment to the wireless communication network; and
   one or more processing circuits configured to:
      receive, via the wireless interface, assistance data that indicates positioning occasion periodicities of a first one of said cells and a reference cell, and that indicates a positioning occasion timing offset between the first cell and the reference cell;
      determine whether the positioning occasion periodicity of the reference cell is larger than that of the first cell; and
      responsive to determining that the positioning occasion periodicity of the reference cell is larger than that of the first cell, identify when a positioning occasion of the first cell will first occur after the next positioning occasion of the reference cell, according to the positioning occasion timing offset indicated in the assistance data, and determine when other positioning occasions of the first cell will occur, based on said identification and the positioning occasion periodicity of the first cell indicated in the assistance data.

32. The user equipment of claim 31, wherein the one or more processing circuits are configured, responsive to determining when said other positioning occasions of the first cell will occur, to time assisted positioning measurements for the first cell based on that determination, including performing assisted positioning measurements during one or more positioning occasions of the first cell that occur before the next positioning occasion of the reference cell.

33. The user equipment of claim 31, wherein said positioning measurements comprise Reference Signal Time Difference (RSTD) measurements for Observed Time Difference of Arrival (OTDOA) positioning.

34. The user equipment of claim 31, wherein the wireless communication network comprises a Long Term Evolution (LTE) network, wherein the positioning signals comprise Positioning Reference Signals (PRS), wherein prs-ConfigurationIndex elements in the assistance data indicate the positioning occasion periodicities of the first cell and the reference cell, and wherein a prs-SubframeOffset element in the assistance data indicates said positioning occasion timing offset.

* * * * *

UNITED STATES PATENT AND TRADEMARK OFFICE
CERTIFICATE OF CORRECTION

| | |
|---|---|
| PATENT NO. | : 8,849,302 B2 |
| APPLICATION NO. | : 13/390626 |
| DATED | : September 30, 2014 |
| INVENTOR(S) | : Siomina et al. |

Page 1 of 2

It is certified that error appears in the above-identified patent and that said Letters Patent is hereby corrected as shown below:

On the title page item (57), under "ABSTRACT", in Column 1, Line 2, delete "(360" and insert -- (36) --, therefor.

In the Specification

In Column 2, Line 37, delete "E-SMLC 14" and insert -- E-SMLC 18 --, therefor.

In Column 2, Line 39, delete "SLP 16" and insert -- SLP 20 --, therefor.

In Column 3, Line 9, delete "((RATS)" and insert -- (RATs) --, therefor.

In Column 3, Line 58, delete "sub-frames," and insert -- sub-frames. --, therefor.

In Column 5, Line 10, delete "pica or" and insert -- pico or --, therefor.

In Column 6, Line 4, delete "36,133," and insert -- 36.133, --, therefor.

In Column 7, Line 42, delete "ProvideAssisianceData" and insert -- ProvideAssistanceData --, therefor.

In Column 8, Line 16, delete "regard." and insert -- regard, --, therefor.

In Column 12, Line 32, delete "SUPL." and insert -- SUPL, --, therefor.

In Column 13, Line 38, delete "occur, As" and insert -- occur. As --, therefor.

In Column 13, Line 58, delete "differently," and insert -- differently. --, therefor.

Signed and Sealed this
Ninth Day of June, 2015

Michelle K. Lee
*Director of the United States Patent and Trademark Office*

In Column 14, Line 25, delete "standards, In" and insert -- standards. In --, therefor.

In Column 14, Line 35, delete "RATs," and insert -- RATs. --, therefor.